United States Patent
Cui et al.

(10) Patent No.: US 11,349,680 B2
(45) Date of Patent: May 31, 2022

(54) METHOD AND APPARATUS FOR PUSHING INFORMATION BASED ON ARTIFICIAL INTELLIGENCE

(71) Applicant: BEIJING BAIDU NETCOM SCIENCE AND TECHNOLOGY CO., LTD., Beijing (CN)

(72) Inventors: Jianqing Cui, Beijing (CN); Yingchao Shi, Beijing (CN); Hao Tian, Beijing (CN); Qiaoqiao She, Beijing (CN); Shiqi Zhao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 972 days.

(21) Appl. No.: 16/054,812

(22) Filed: Aug. 3, 2018

(65) Prior Publication Data
US 2019/0058609 A1    Feb. 21, 2019

(30) Foreign Application Priority Data
Aug. 15, 2017   (CN) .......................... 201710696548.8

(51) Int. Cl.
*H04L 12/18*   (2006.01)
*H04N 21/25*   (2011.01)
(Continued)

(52) U.S. Cl.
CPC ......... *H04L 12/1859* (2013.01); *G06N 20/00* (2019.01); *G06V 20/42* (2022.01); *H04N 21/251* (2013.01); *G06V 20/44* (2022.01)

(58) Field of Classification Search
CPC .......................... H04L 12/1859; G06N 20/00; G06K 9/00724; G06K 2009/00738; H04N 21/251; G06V 20/42; G06V 20/44
See application file for complete search history.

(56) References Cited

U.S. PATENT DOCUMENTS

2010/0180297 A1 *   7/2010   Levine ............... H04N 21/4438
                                                              725/38
2010/0217730 A1     8/2010   Zhao et al.
(Continued)

FOREIGN PATENT DOCUMENTS

CN         103559206 A     2/2014
CN         104142940 A    11/2014

*Primary Examiner* — Randy A Flynn
(74) *Attorney, Agent, or Firm* — Knobbe, Martens, Olson & Bear, LLP (57) ABSTRACT

Embodiments of the disclosure disclose a method and apparatus for pushing information based on artificial intelligence. A specific embodiment of the method includes: mining, in response to a new match occurring, real-time match data of the match and real-time associated data of the match; generating structured data using the real-time match data; generating a to-be-recommended item using the real-time associated data and an offline item; determining whether a current time point is a recommendation node based on the structured data and real-time match state information acquired from a state manager; generating a to-be-pushed message based on the to-be-recommended item, the real-time match state information, and basic match information acquired from the state manager, and updating a to-be-pushed message record in the state manager, if the current time point is the recommendation node; and pushing the to-be-pushed message. The embodiment has improved the quality and timeliness of pushing a to-be-pushed message.

19 Claims, 5 Drawing Sheets

(51) Int. Cl.
*G06N 20/00* (2019.01)
*G06V 20/40* (2022.01)

(56) References Cited

U.S. PATENT DOCUMENTS

2015/0026706 A1* 1/2015 Leamon ............. H04N 21/4668
　　　　　　　　　　　　　　　　　　　725/9
2017/0061314 A1* 3/2017 Schnurr ........... H04N 21/23418

* cited by examiner

METHOD AND APPARATUS FOR PUSHING INFORMATION BASED ON ARTIFICIAL INTELLIGENCE

CROSS-REFERENCE TO RELATED APPLICATIONS

This application claims priority to Chinese Patent Application no. 201710696548.8, filed with the State Intellectual Property Office of the People's Republic of China (SIPO) on Aug. 15, 2017, the content of which is incorporated herein by reference in its entirety.

TECHNICAL FIELD

The disclosure relates to the field of computer technology, specifically to the field of computer network technology, and more specifically to a method and apparatus for pushing information based on artificial intelligence.

BACKGROUND

Rapid development of the artificial intelligence (AI) technology facilitates daily work and life. Artificial intelligence is a new technical science that studies and develops theories, methods, techniques and application systems for simulating, extending and expanding human intelligence. Artificial intelligence is a branch of computer science that attempts to understand the essence of intelligence and produces new intelligent machinery capable of responding in a way similar to human intelligence. Studies in the field include robots, speech recognition, image recognition, natural language processing, expert systems, and the like. The artificial intelligence is increasingly integrated into applications. Applications combining with the artificial intelligence may accurately determine information types, and push different types of information to appropriate users based on the needs of the different users.

With the rapid development of the artificial intelligence, enabling machinery to have intelligence comparable to the human intelligence is desired by numerous enterprises. In this context, machinery is expected to be able to complete the information commented by the commentator in the commentary of a sports event.

At present, in a live broadcast of a sports event, the commentator usually inserts information, such as technical statistics of the players, and audience interaction. Usually, such information is manually selected, monotone, and specifically inserted by the commentator based on the match situation. The timing of inserting information, as well as the inserted information, is subjective. Using this approach of pushing information in non-automatic video and text commentary, information is acquired from many sources, and manually sorted, and relevant information is pushed when the match not under way, such as tipoff, timeout, free throw, and period expiration.

However, this method for pushing information based on the artificial intelligence in the commentary of a sports event has the following problems: professional commentators and related data collection personnel are required; the information is monotone, manual collection of information results in a high cost, usually only certain types of information are pushed; information is less promptly pushed. It is difficult to push information in time at any key moment of the match, for example, push glittering commentary at an exciting moment of a shot. Information can only be pushed afterwards and during a long match suspension.

SUMMARY

An object of the disclosure is to provide an improved method and apparatus for pushing information based on artificial intelligence, to solve a part of the technical problems mentioned in the Background.

In a first aspect, an embodiment of the disclosure provides a method for pushing information based on artificial intelligence, the method including: mining, in response to a new match occurring, real-time match data of the match and real-time associated data of the match; generating structured data using the real-time match data; generating a to-be-recommended item using the real-time associated data and an offline item; determining whether a current time point is a recommendation node based on the structured data and real-time match state information acquired from a state manager; generating a to-be-pushed message based on the to-be-recommended item, the real-time match state information, and basic match information acquired from the state manager, and updating a to-be-pushed message record in the state manager, if the current time point is the recommendation node; and pushing the to-be-pushed message.

In some embodiments, the real-time associated data of the match include one or more of: a real-time image of the match; a real-time video of the match; user generated content of the match; knowledge of the match; or news of the match.

In some embodiments, the determining whether a current time point is a recommendation node based on the structured data and real-time match state information acquired from a state manager includes: determining a current match state vector based on the structured data and a preset characteristic of the real-time match state information acquired from the state manager; searching for a match state vector corresponding to the current match state vector among a data pair of a pre-marked match state vector and a recommendation binary; and determining whether the current time point is the recommendation node, based on the recommendation binary corresponding to the match state vector corresponding to the current match state vector in the data pair.

In some embodiments, the preset characteristic of the real-time match state information includes one or more of: a basic characteristic of the real-time match state information; an event characteristic of the real-time match state information; a context characteristic of the real-time match state information; or a dynamic calculation characteristic of the real-time match state information.

In some embodiments, the generating a to-be-pushed message based on the to-be-recommended item, the real-time match state information, and basic match information acquired from the state manager includes: generating an eigenvector based on a preset characteristic and a weight of the to-be-recommended item; establishing an inverted index of the to-be-recommended item and a source document based on the eigenvector; generating a search formula based on the basic match information and the real-time match state information; determining whether the to-be-recommended item matching the search formula is found in the inverted index; acquiring, if the to-be-recommended item matching the search formula is found, a recommended source document, the recommended source document being the source document corresponding to the to-be-recommended item matching the search formula; jumping to, if the to-be-recommended item matching the search formula is not found, the generating a search formula based on the basic match information and the real-time match state information; and generating the to-be-pushed message based on the recommended source document.

In some embodiments, the preset characteristic of the to-be-recommended item includes one or more of: a playing team of the to-be-recommended item; a team member of the to-be-recommended item; an entity attribute of the to-be-recommended item; or resource generation time of the to-be-recommended item.

In some embodiments, the generating the to-be-pushed message based on the recommended source document includes: sorting the recommended source documents based on the preset characteristic of the recommended source document; calculating, for the sorted recommended source documents, one or more of: a diversity rating of a resource type, a timeliness rating of the resource type, or a popularity rating of the resource type; selecting a to-be-pushed source document from the sorted recommended source documents based on a calculated rating; and generating the to-be-pushed message based on the to-be-pushed source document.

In some embodiments, the preset characteristic of the recommended source document comprises one or more of: a network source of the recommended source document; a search database source of the recommended source document; an overlapping degree between the recommended source document and a current match state vector entity; a mining duration of the recommended source document; or a popularity of the recommended source document.

In some embodiments, the generating a to-be-pushed message includes: generating the to-be-pushed message using a commentary model.

In a second aspect, an embodiment of the disclosure provides an apparatus for pushing information based on artificial intelligence, the apparatus including: a match data mining unit configured for mining, in response to a new match occurring, real-time match data of the match and real-time associated data of the match; a structured data generation unit configured for generating structured data using the real-time match data; a to-be-recommended item generation unit configured for generating a to-be-recommended item using the real-time associated data and an offline item; a recommendation node determination unit configured for determining whether a current time point is a recommendation node based on the structured data and real-time match state information acquired from a state manager; a to-be-pushed message generation unit configured for generating a to-be-pushed message based on the to-be-recommended item, the real-time match state information, and basic match information acquired from the state manager, and updating a to-be-pushed message record in the state manager, if the current time point is the recommendation node; and a to-be-pushed message push unit configured for pushing the to-be-pushed message.

In some embodiments, the real-time associated data of the match in the match data mining unit include one or more of: a real-time image of the match; a real-time video of the match; user generated content of the match; knowledge of the match; or news of the match.

In some embodiments, the recommendation node determination unit includes: a state vector determination subunit configured for determining a current match state vector based on the structured data and a preset characteristic of the real-time match state information acquired from the state manager; a corresponding data pair search subunit configured for searching for a match state vector corresponding to the current match state vector among a data pair of a pre-marked match state vector and a recommendation binary; and a recommendation node determination subunit configured for determining whether the current time point is the recommendation node, based on the recommendation binary corresponding to the match state vector corresponding to the current match state vector in the data pair.

In some embodiments, the preset characteristic of the real-time match state information in the state vector determination subunit includes one or more of: a basic characteristic of the real-time match state information; an event characteristic of the real-time match state information; a context characteristic of the real-time match state information; or a dynamic calculation characteristic of the real-time match state information.

In some embodiments, the to-be-pushed message generation unit includes: an eigenvector generation subunit configured for generating an eigenvector based on a preset characteristic and a weight of the to-be-recommended item; an inverted index establishing subunit configured for establishing an inverted index of the to-be-recommended item and a source document based on the eigenvector; a search formula generation subunit configured for generating a search formula based on the basic match information and the real-time match state information; a search result determination subunit configured for determining whether the to-be-recommended item matching the search formula is found in the inverted index; a source document acquisition subunit configured for acquiring, if the to-be-recommended item matching the search formula is found, a recommended source document, the recommended source document being the source document corresponding to the to-be-recommended item matching the search formula; a search formula update subunit configured for jumping to, if the to-be-recommended item matching the search formula is not found, the generating a search formula based on the basic match information and the real-time match state information; and a to-be-pushed message generation subunit configured for generating the to-be-pushed message based on the recommended source document.

In some embodiments, the preset characteristic of the to-be-recommended item in the eigenvector generation subunit includes one or more of: a playing team of the to-be-recommended item; a team member of the to-be-recommended item; an entity attribute of the to-be-recommended item; or resource generation time of the to-be-recommended item.

In some embodiments, the to-be-pushed message generation subunit includes: a source document sorting subunit configured for sorting the recommended source documents based on the preset characteristic of the recommended source document; a document rating calculation subunit configured for calculating, for the sorted recommended source documents, one or more of: a diversity rating of a resource type, a timeliness rating of the resource type, or a popularity rating of the resource type; a to-be-pushed document selection subunit configured for selecting a to-be-pushed source document from the sorted recommended source documents based on a calculated rating; and a to-be-pushed message generation subunit configured for generating the to-be-pushed message based on the to-be-pushed source document.

In some embodiments, the preset characteristic of the recommended source document in the source document sorting subunit includes one or more of: a network source of the recommended source document; a search database source of the recommended source document; an overlapping degree between the recommended source document and a current match state vector entity; a mining duration of the recommended source document; or a popularity of the recommended source document.

In some embodiments, the to-be-pushed message generation unit is further configured for: generating the to-be-pushed message using a commentary model.

In a third aspect, an embodiment of the disclosure provides a device, including: one or more processors; and a memory for storing one or more programs, where the one or more programs enable, when executed by the one or more processors, the one or more processors to implement the method for pushing information based on artificial intelligence according to any one of the above embodiments.

In a fourth aspect, an embodiment of the disclosure provides a computer readable storage medium storing a computer program therein, where the program implements, when executed by a processor, the method for pushing information based on artificial intelligence according to any one of the above embodiments.

A method and apparatus for pushing information based on artificial intelligence provided by embodiments of the disclosure first mine, in response to a new match occurring, real-time match data of the match and real-time associated data of the match; then generate structured data using the real-time match data; then generate a to-be-recommended item using the real-time associated data and an offline item; then determine whether a current time point is a recommendation node based on the structured data and real-time match state information acquired from a state manager; then generate a to-be-pushed message based on the to-be-recommended item, the real-time match state information, and basic match information acquired from the state manager, and update a to-be-pushed message record in the state manager, if the current time point is the recommendation node; and finally push the to-be-pushed message, thereby saving labor cost without the need of professional commentators and related data collection personnel, pushing abundant and more comprehensive types of to-be-pushed messages, pushing information in time at any key moment of the match, and improving the quality and timeliness of pushing a to-be-pushed message.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
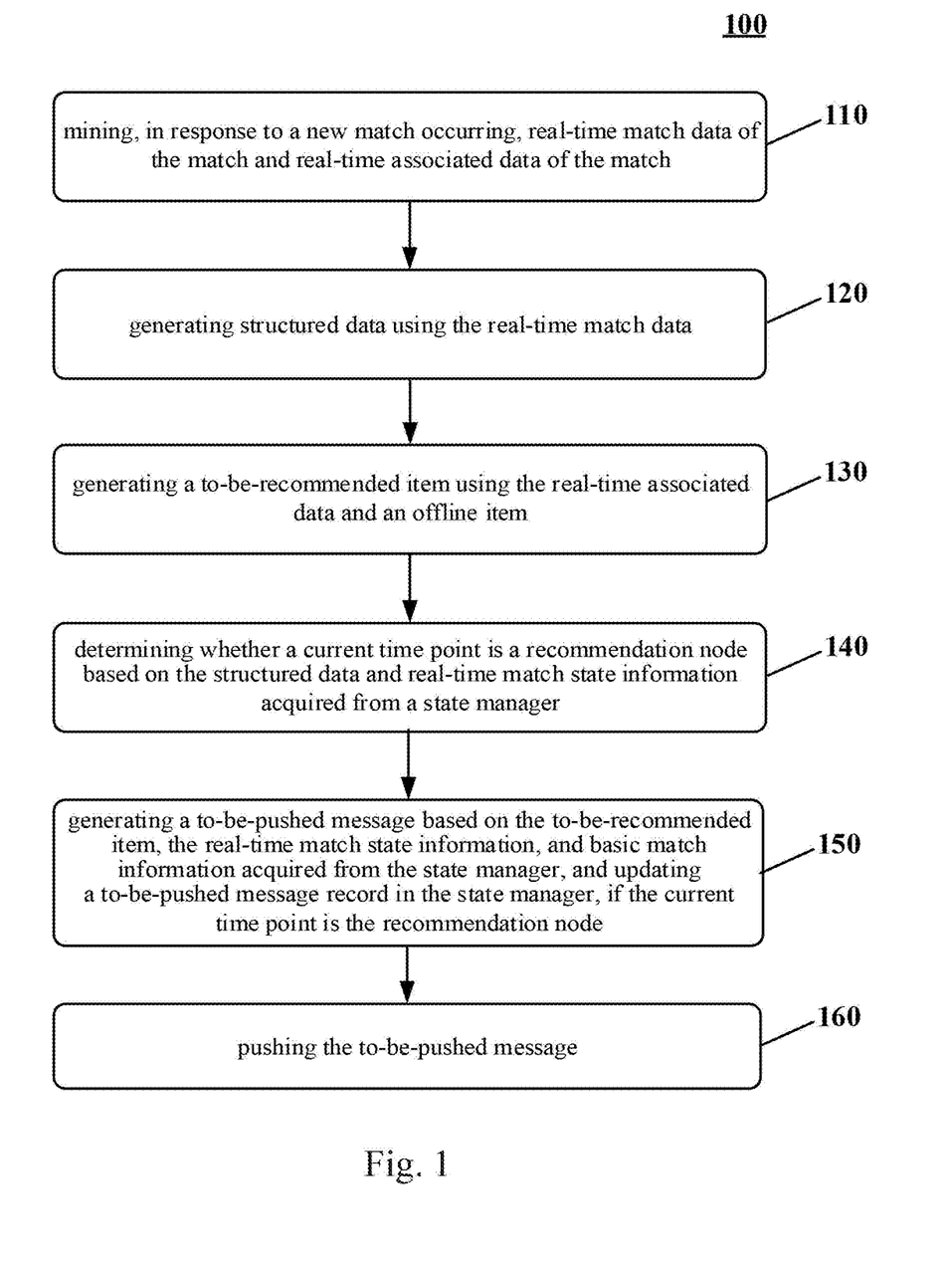
FIG. 1 is a schematic process diagram of an embodiment of a method for pushing information based on artificial intelligence according to the disclosure.

FIG. 1 is a process 100 of an embodiment of a method for pushing information based on artificial intelligence according to the disclosure. The method for pushing information based on artificial intelligence includes:

Step 110: mining, in response to a new match occurring, real-time match data of the match and real-time associated data of the match.

In this embodiment, an electronic device on which a method for pushing information based on artificial intelligence runs may mine, in response to monitoring a new match occurring or receiving a notice on the new match, real-time match data of the match and real-time associated data of the match. The real-time match data here refer to the real-time data of a live match, for example: XX has made three field goals. The real-time associated data here refer to data that are mined in real time and associated with the match, e.g., news, images, videos, and other information associated with the match.

In some optional implementations of the embodiment, the real-time associated data of the match include one or more of: a real-time image of the match; a real-time video of the match; user generated content (UGC) of the match; knowledge of the match; or news of the match. The "real-time" here refers to the given time during the occurrence and development of the match. The user generated content here refers to the content generated by a user.

Step 120: generating structured data using the real-time match data.

In the embodiment, the structured data is a description of an event in the match. The event here includes a series of actions associated with a data item or several data items in the match. For example, in a basketball match, a three-point shot is an event that corresponds to structured data, including following fields: three-point: 1, player: XX, and team: YY.

Step 130: generating a to-be-recommended item using the real-time associated data and an offline item.

In the embodiment, the real-time associated data mainly include all network resources associated with the current match, which are marked with resource generation time, and are stored in a to-be-recommended item database based on the resource type. The to-be-recommended item database has offline stored offline mined resources (i.e., offline items). Real-time associated data and offline items may be integrated to generate a to-be-recommended item for use in subsequent generation of a to-be-pushed message.

Step 140: determining whether a current time point is a recommendation node based on the structured data and real-time match state information acquired from a state manager.

In the embodiment, an event occurring in a match may be determined based on the structured data, and then a current state of the match may be determined by referring to real-time match state information acquired from a state manager, thereby whether the current time point is a recommendation node is determined based on the current state of the match.

The state manager here contains basic match information, i.e., the information that does not change with the current match, and can be found in a database prior to the match. For example, basic match information, e.g., of basketball, may include basic information, such as a player (height, body weight, and role), a field goal percentage, historical statistical information, and a team of the player. Such basic information may have weights (for example, weights of the timeliness of the last round, the last two rounds and the last few rounds are reduced successively), and sources (e.g., sourced from the current, historical (history of the current match) databases), and the like. The state manager may further contain a to-be-pushed message record and real-time match state information.

Specifically, in some optional implementations of the embodiment, a current match state vector may be determined based on the structured data and a preset characteristic of the real-time match state information acquired from the state manager, then a match state vector corresponding to the current match state vector may be searched in data pairs of a pre-marked match state vector and a recommendation binary, and finally whether the current time point is the recommendation node is determined, based on the recommendation binary corresponding to the match state vector corresponding to the current match state vector in the data pair.

In the implementation, the preset characteristic of the real-time match state information may include one or more of: a basic characteristic of the real-time match state information; an event characteristic of the real-time match state information; a context characteristic of the real-time match state information; or a dynamic calculation characteristic of the real-time match state information.

Here, the basic characteristic of the real-time match state information refers to an objective characteristic of the match; the event characteristic of the real-time match state information refers to a characteristic of a series of actions associated with a data item or several data items in the match; the context characteristic of the real-time match state information refers to at least one of a context of a given event of a given playing team or a context of a given event of a given player; and the dynamic calculation characteristic of the real-time match state information refers to a characteristic requiring dynamic calculation as the match is going on.

Illustratively, taking basketball as an example, the basic characteristic of the real-time match state information refers to a period number, time left in a current period, a point difference between opposing teams, and the like; the event characteristic of the real-time match state information refers to a three-point shot, a two-point shot, an assist, a free throw, a rebound, a foul, a timeout, period initiation, period expiration, and the like, as well as success or failure of the event, relevant players, relevant teams, and the like; the context characteristic of the real-time match state information refers to a context of a given event of a given playing team, a context of a given event of a given player, and the like; and the dynamic calculation characteristic of the real-time match state information refers to the number of consecutive three-point shot iterations, the number of consecutive shot iterations of a player, the number of consecutive shot iterations of a team, the number of consecutive turnover iterations of a player, the number of consecutive turnover iterations of a team, and the like.

The determining a recommendation time point here refers to determining whether the current time is appropriate for resource recommendation. There are many different types of appropriate recommendation time points. Still taking basketball as an example for illustrative description, an appropriate recommendation time point may be: A player has been making field goals, and after the player has made a wonderful field goal, technical statistical data of the player in the match until now may be given; and when the match enters a timeout stage, exciting moments, wonderful images, real-time news, or user comments of the match may be recommended.

Whether the current time point is a recommendation node may be determined using a classification model. The classification is a binary classification problem as to determining whether a resource may be recommended based on a given current match state vector. A training corpus needs to be manually marked with at what time point a resource can be recommended. Based on manually annotated data and the state manager, a data pair of a match state vector and a recommendation binary is generated, and a classification model is trained using a classifier (such as a support vector machine, svm). Characteristics employed to train the classification model may include the basic characteristic, the event characteristic, the context characteristic, the dynamic calculation characteristic, and the like.

Step 150: generating a to-be-pushed message based on the to-be-recommended item, the real-time match state information, and basic match information acquired from the state manager, and updating a to-be-pushed message record in the state manager, if the current time point is the recommendation node.

In the embodiment, if the current time point is the recommendation node, a to-be-recommended content may be determined from the to-be-recommended item and a to-be-pushed message may be generated, based on the basic match information and the real-time match state information acquired from the state manager. A to-be-pushed message record in the state manager may also be updated to facilitate acquiring the current to-be-recommended message record in the next recommendation.

In some optional implementations of the embodiment, when generating a to-be-pushed message based on data, a commentary model may be used to generate the to-be-pushed message based on data. The commentary model here may be obtained by training based on previous commentary data, including keywords of inputted data, a combinational rule of keywords, and the like. When data are inputted into the commentary model, an outputted to-be-pushed message may be obtained, and the to-be-pushed message matches the characteristics of the commentary data.

Step 160: pushing the to-be-pushed message.

In the embodiment, after generating the to-be-pushed message in the step 150, the to-be-pushed message may be pushed to a user terminal.

The method for pushing information based on artificial intelligence provided by the embodiments of the disclosure may save labor cost without the need of professional commentators and related data collection personnel, push abundant and more comprehensive types of to-be-pushed messages, push information in time at key moments of any match, and improve the quality and timeliness of pushing a to-be-pushed message.

Figure 2:
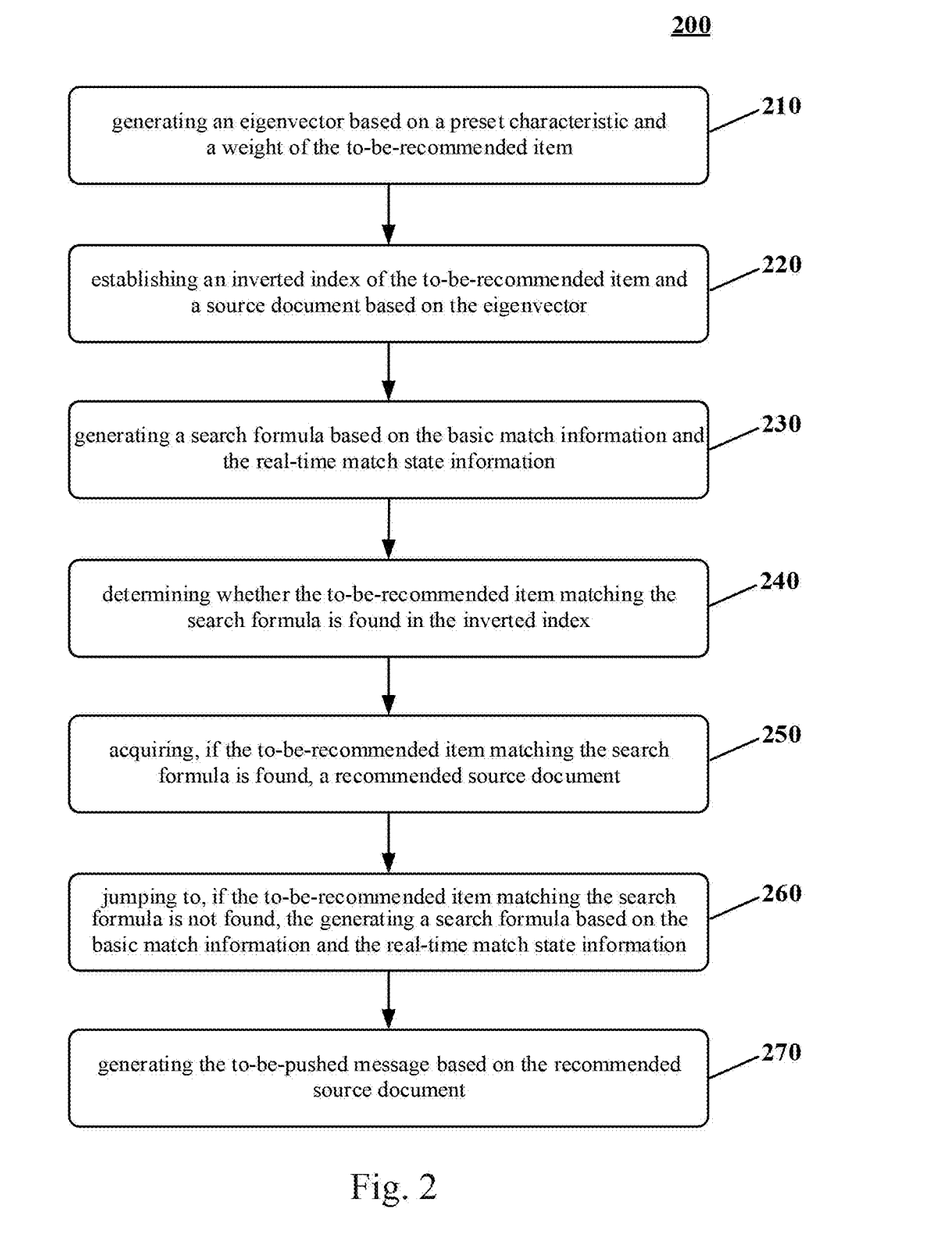
FIG. 2 is a schematic process diagram of an embodiment of a method for generating a to-be-pushed message based on artificial intelligence in a method for pushing information based on artificial intelligence according to the disclosure.

Furthermore, please refer to FIG. 2. FIG. 2 shows a schematic process of an embodiment of a method for generating a to-be-pushed message based on artificial intelligence in a method for pushing information based on artificial intelligence according to the disclosure.

As shown in FIG. 2, the method 200 for pushing information based on artificial intelligence includes:

Step 210: generating an eigenvector based on a preset characteristic and a weight of the to-be-recommended item.

In the embodiment, an electronic device on which a method for pushing information based on artificial intelligence runs may pre-process a to-be-recommended item, i.e., generating an eigenvector based on a preset characteristic and a weight of the to-be-recommended item. The preset characteristic of the to-be-recommended item here refers to a pre-determined characteristic for filtering to-be-recommended items. For example, the preset characteristic of the to-be-recommended item may include one or more of: a playing team of the to-be-recommended item; a team member of the to-be-recommended item; an entity attribute of the to-be-recommended recommended item; or resource generation time of the to-be-recommended item. The entity attribute here refers to a description of an entity element.

Step 220: establishing an inverted index of the to-be-recommended item and a source document based on the eigenvector.

In the embodiment, a source document may be indicated by the generated eigenvector based on the preset characteristic and the weight of the to-be-recommended item. Therefore, an inverted index of the to-be-recommended item and the source document may be established based on the eigenvector, and the to-be-recommended item may be established into a search database of a search engine.

Step 230: generating a search formula based on the basic match information and the real-time match state information.

In the embodiment, a current match state vector may be generated based on the basic match information and real-time match state information acquired from the state manager, and then a search formula may be generated by extracting an entity in the current state vector.

Step 240: determining whether the to-be-recommended item matching the search formula is found in the inverted index.

In the embodiment, associated information is searched for in the search database established in the step 220 using the search formula, step 250 is executed if the associated information is found, and step 260 is executed if the associated information is not found.

Step 250: acquiring, if the to-be-recommended item matching the search formula is found, a recommended source document.

In the embodiment, the recommended source document is the source document corresponding to the to-be-recommended item matching the search formula.

Step 260: jumping to, if the to-be-recommended item matching the search formula is not found, the generating a search formula based on the basic match information and the real-time match state information.

Step 270: generating the to-be-pushed message based on the recommended source document.

In the embodiment, the recommended source document may be processed using a pre-established algorithm for generating a to-be-pushed message, to obtain the to-be-pushed message.

The algorithm for generating a to-be-pushed message here may be an algorithm for generating a to-be-pushed message in existing technologies or technologies to be developed in the future, and is not limited in the disclosure. For example, the recommended source document may be processed using a commentary model, to obtain the to-be-pushed message. The commentary model here may be obtained by training based on previous commentary data, including keywords of inputted data, a combinational rule of keywords, and the like. When data are inputted into the commentary model, an outputted to-be-pushed message may be obtained, and the to-be-pushed message matches the characteristics of the commentary data.

In some optional implementations of the embodiment, the generating the to-be-pushed message based on the recommended source document may include: sorting the recommended source documents based on the preset characteristic of the recommended source document; calculating, for the sorted recommended source documents, one or more of: a diversity rating of a resource type, a timeliness rating of the resource type, or a popularity rating of the resource type; selecting a to-be-pushed source document from the sorted recommended source documents based on a calculated rating; and generating the to-be-pushed message based on the to-be-pushed source document.

In the implementation, the preset characteristic may be a preset characteristic concerned by those skilled in the art. For example, a preset characteristic of a recommended source document may include one or more of: a network source of the recommended source document; a search database source of the recommended source document; an overlapping degree between the recommended source document and a current match state vector entity; a mining duration of the recommended source document; or a popularity of the recommended source document.

Here, first, the recommended source documents acquired based on the search result may be sorted using a linear sorting model, and a network source of the recommended source document, a search database source of the recommended source document, a satisfaction degree of the recommended source document (i.e., an overlapping degree between the recommended source document and the current match state vector entity), a mining duration of the recommended source document, or a popularity of the recommended source document may be selected as the characteristic. Finally, a recommended source document may be selected from the sorted recommended source documents based on a selection strategy considering one or more of: a diversity of a resource type, a timeliness of the resource type, a popularity of the resource type, or the like. Finally, a to-be-pushed message is generated.

The method for pushing information based on artificial intelligence provided by the embodiments of the disclosure establishes an inverted index based on an eigenvector, then determines an to-be-recommended item matching the search formula from the inverted index, then determines a recommended source document corresponding to the to-be-recommended item matching the search formula, and finally generates a to-be-pushed message based on the recommended source document, thereby enhancing the accuracy and abundance of the to-be-pushed message.

An illustrative application scenario of a method for pushing information based on artificial intelligence according to an embodiment of the disclosure is described below in conjunction with FIG. 3.

Figure 3:
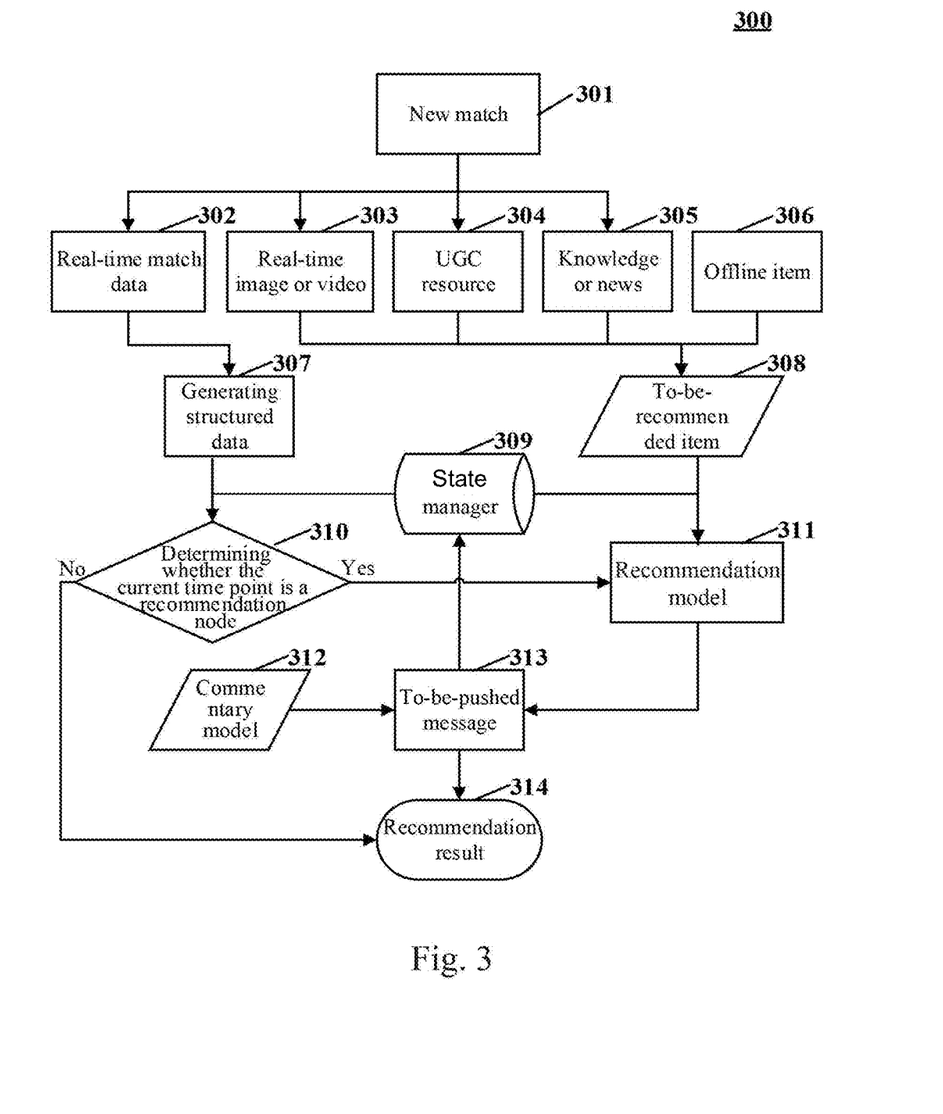
FIG. 3 is a schematic process diagram of an application scenario of a method for pushing information based on artificial intelligence according to an embodiment of the disclosure.

As shown in FIG. 3, FIG. 3 shows a schematic process diagram of an application scenario of a method for pushing information based on artificial intelligence according to an embodiment of the disclosure.

As shown in FIG. 3, a method 300 for pushing information based on artificial intelligence includes: first, finding a new match 301; then, mining real-time match data 302, a real-time image and/or video 303, user generated content 304, knowledge and/or news 305 and the like of the new match 301; then generating structured data 307 using the real-time match data 302, and generating a to-be-recommended item 308 using the real-time image and/or video 303, the user generated content 304, the knowledge and/or news 305 and the like, and an offline item 306; then determining whether the current time point is a recommendation node based on the structured data 308 and real-time match state information acquired from a state manager 309; generating a to-be-pushed message 313 based on the to-be-recommended item 308, and the real-time match state information and basic match information acquired from the state manager 309, and based on a recommendation model 311 and a commentary model 312, updating a to-be-pushed message record in the state manager 309, and outputting the to-be-pushed message as a recommendation result 314, if the current time point is the recommendation node; and outputting a non-recommendation node as the recommendation result 314, if the current time point is not the recommendation node.

Here, the recommendation model 311 may include a search model and a sorting model, i.e., a maintenance-based state manager 309, generate a current match state vector; extract an entity in the current state vector, generate a search formula; search for different resource types in the search model (including the inverted index in the above embodiments); and then sort searched recommended source documents. A linear model may be used as the sorting model, and one or more of: a network source of the recommended source document, a search database source of the recommended source document, a satisfaction degree of the recommended source document (i.e., an overlapping degree between the recommended source document and a current match state vector entity), a mining duration of the recommended source document, or the recommended source document may be selected as the preset characteristic used in the sorting. Finally, a recommended source document may be selected from the sorted recommended source documents based on a selection strategy considering following aspects: a diversity of a resource type, a timeliness of the resource type, a popularity of the resource type, or the like. Finally, a to-be-pushed message is generated based on the selected recommended source document.

It should be appreciated that the method for pushing information based on artificial intelligence as shown in FIG. 3 is only an illustrative embodiment of the method for pushing information based on artificial intelligence, and does not represent limitations on the disclosure. For example, in FIG. 3, a to-be-pushed message may also be generated based on a preset generation rule, rather than using the commentary model.

The method for pushing information based on artificial intelligence provided in the above application scenario of the disclosure may improve the quality and timeliness of pushing a message.

Figure 4:
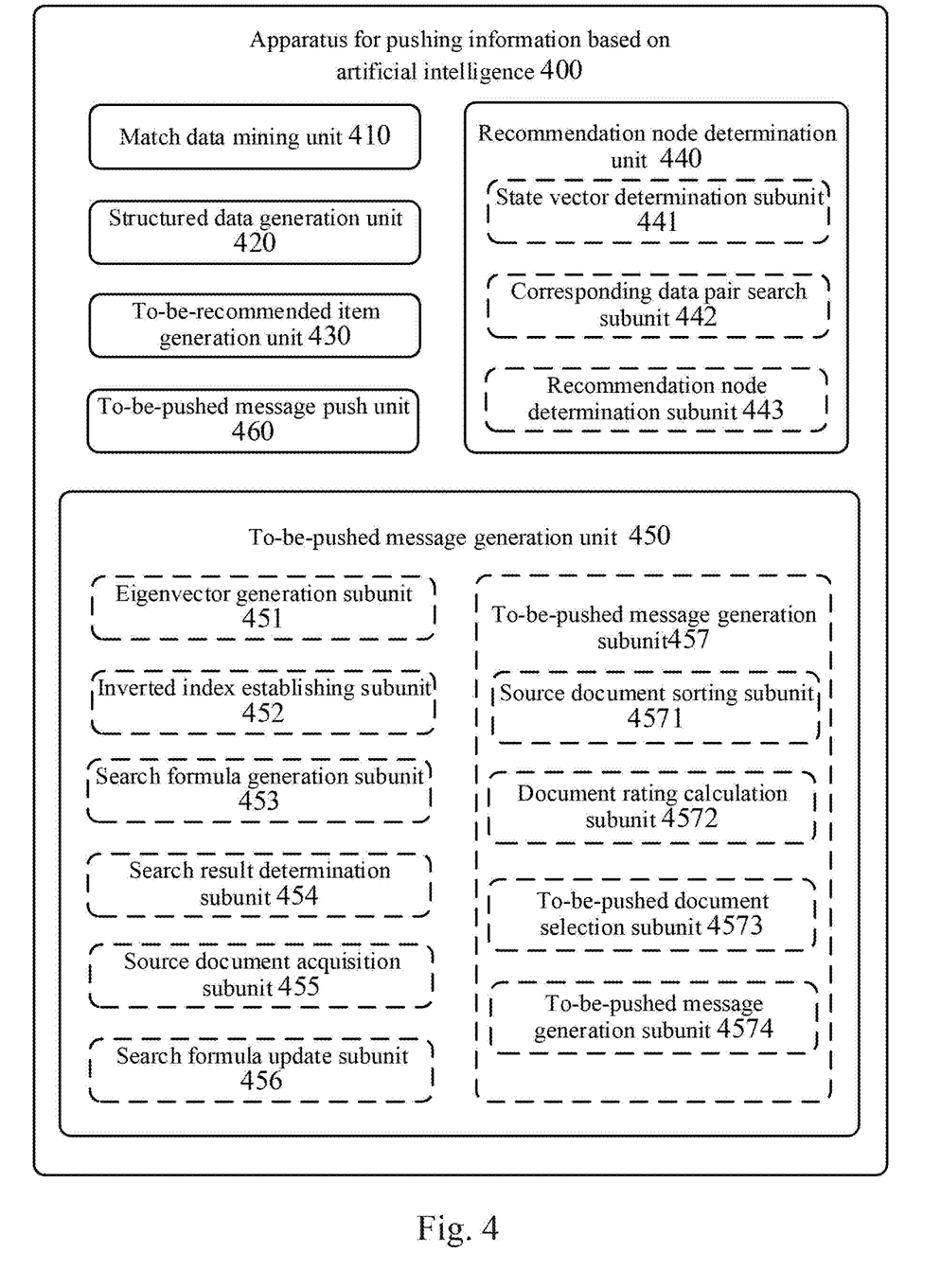
FIG. 4 is an illustrative structural diagram of an embodiment of an apparatus for pushing information based on artificial intelligence according to the disclosure.

Further referring to FIG. 4, as an implementation of the above method, an embodiment of the disclosure provides an embodiment of an apparatus for pushing information based on artificial intelligence, and the embodiment of the apparatus for pushing information based on artificial intelligence corresponds to the embodiment of the method for pushing information based on artificial intelligence as shown in FIG. 1 to FIG. 3. Thus, the operations and characteristics described vis-a-vis the method for pushing information based on artificial intelligence in FIG. 1 to FIG. 3 hereinbefore also apply to an apparatus 400 for pushing information based on artificial intelligence and units contained therein, and are not repeated any more here.

As shown in FIG. 4, the apparatus 400 for pushing information based on artificial intelligence includes: a match data mining unit 410, a structured data generation unit 420, a to-be-recommended item generation unit 430, a recommendation node determination unit 440, a to-be-pushed message generation unit 450, and a to-be-pushed message push unit 460.

The match data mining unit 410 is used for mining, in response to a new match occurring, real-time match data of the match and real-time associated data of the match; the structured data generation unit 420 is used for generating structured data using the real-time match data; the to-be-recommended item generation unit 430 is used for generating a to-be-recommended item using the real-time associated data and an offline item; the recommendation node determination unit 440 is used for determining whether a current time point is a recommendation node based on the structured data and real-time match state information acquired from a state manager; the to-be-pushed message generation unit 450 is used for generating a to-be-pushed message based on the to-be-recommended item, the real-time match state information, and basic match information acquired from the state manager, and updating a to-be-pushed message record in the state manager, if the current time point is the recommendation node; and the to-be-pushed message push unit 460 is used for pushing the to-be-pushed message.

In some optional implementations of the embodiment, the real-time associated data of the match in the match data mining unit 410 include one or more of: a real-time image of the match; a real-time video of the match; user generated content of the match; knowledge of the match; or news of the match.

In some optional implementations of the embodiment, the recommendation node determination unit 440 includes: a state vector determination subunit 441 configured for determining a current match state vector based on the structured data and a preset characteristic of the real-time match state information acquired from the state manager; a corresponding data pair search subunit 442 configured for searching for a match state vector corresponding to the current match state vector among a data pair of a pre-marked match state vector and a recommendation binary; and a recommendation node determination subunit 443 configured for determining whether the current time point is the recommendation node, based on the recommendation binary corresponding to the match state vector corresponding to the current match state vector in the data pair.

In some optional implementations of the embodiments, a preset characteristic of the real-time match state information in the state vector determination subunit 441 includes one or more of: a basic characteristic of the real-time match state information; an event characteristic of the real-time match state information; a context characteristic of the real-time match state information; or a dynamic calculation characteristic of the real-time match state information.

In some optional implementations of the embodiment, the to-be-pushed message generation unit 450 includes: an eigenvector generation subunit 451 configured for generating an eigenvector based on a preset characteristic and a weight of the to-be-recommended item; an inverted index establishing subunit 452 configured for establishing an inverted index of the to-be-recommended item and a source document based on the eigenvector; a search formula generation subunit 453 configured for generating a search formula based on the basic match information and the real-time match state information; a search result determination subunit 454 configured for determining whether the to-be-recommended item matching the search formula is found in the inverted index; a source document acquisition subunit 455 configured for acquiring, if the to-be-recommended item matching the search formula is found, a recommended source document, the recommended source document being the source document corresponding to the to-be-recommended item matching the search formula; a search formula update subunit 456 configured for jumping to, if the to-be-recommended item matching the search formula is not found, the generating a search formula based on the basic match information and the real-time match state information; and a to-be-pushed message generation subunit 457 configured for generating the to-be-pushed message based on the recommended source document.

In some optional implementations of the embodiment, a preset characteristic of the to-be-recommended item in the eigenvector generation subunit 451 includes one or more of: a playing team of the to-be-recommended item; a team member of the to-be-recommended item; an entity attribute of the to-be-recommended item; or resource generation time of the to-be-recommended item.

In some optional implementations of the embodiments, the to-be-pushed message generation subunit 457 includes: a source document sorting subunit 4571 configured for sorting the recommended source documents based on the preset characteristic of the recommended source document; a document rating calculation subunit 4572 configured for calculating, for the sorted recommended source documents, one or more of: a diversity rating of a resource type, a timeliness rating of the resource type, or a popularity rating of the resource type; a to-be-pushed document selection subunit 4573 configured for selecting a to-be-pushed source document from the sorted recommended source documents based on a calculated rating; and a to-be-pushed message generation subunit 4574 configured for generating the to-be-pushed message based on the to-be-pushed source document.

In some optional implementations of the embodiment, a preset characteristic of the recommended source document in the source document sorting subunit 4571 includes one or more of: a network source of the recommended source document; a search database source of the recommended source document; an overlapping degree between the recommended source document and a current match state vector entity; a mining duration of the recommended source document; or a popularity of the recommended source document.

In some optional implementations of the embodiment, the to-be-pushed message generation unit 450 is further configured for: generating the to-be-pushed message using a commentary model.

The disclosure further provides an embodiment of a device, including: one or more processors; and a memory, for storing one or more programs, where the one or more programs enable, when executed by the one or more processors, the one or more processors to implement the method for pushing information based on artificial intelligence according to any one of the above embodiments.

The disclosure further provides an embodiment of a computer readable storage medium storing a computer program therein, where the program implements, when executed by a processor, the method for pushing information based on artificial intelligence according to any one of the above embodiments.

Figure 5:
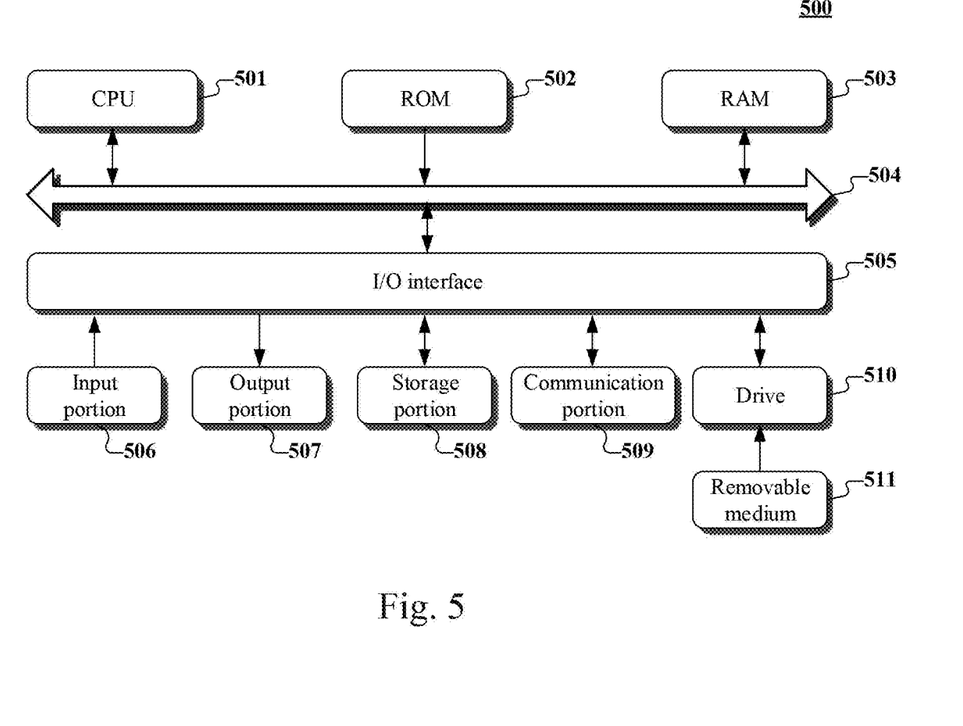
FIG. 5 is a schematic diagram of a structure of a computer system suitable for implementing a terminal device or a server according to an embodiment of the disclosure.

Referring to FIG. 5, a schematic structural diagram of a computer system 500 adapted to implement a terminal device or a server of the embodiments of the present application is shown. The terminal device shown in FIG. 5 is merely an example and should not impose any restriction on the function and scope of use of the embodiments of the present application.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A drive 510 is also connected to the I/O interface 505 as required. A removable medium 511, such as a magnetic disk, an optical disk, a magneto-optical disk, and a semiconductor memory, may be installed on the drive 510, to facilitate the retrieval of a computer program from the removable medium 511, and the installation thereof on the storage portion 508 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure.

It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto.

The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a match data mining unit, a structured data generation unit, a to-be-recommended item generation unit, a recommendation node determination unit, a to-be-pushed message generation unit, and a to-be-pushed message push unit, where the names of these units or modules do not in some cases constitute a limitation to such units or modules themselves. For example, the match data mining unit may also be described as "a unit for mining, in response to a new match occurring, real-time match data of the match and real-time associated data of the match."

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: mine, in response to a new match occurring, real-time match data of the match and real-time associated data of the match; generate structured data using the real-time match data; generate a to-be-recommended item using the real-time associated data and an offline item; determine whether a current time point is a recommendation node based on the structured data and real-time match state information acquired from a state manager; generate a to-be-pushed message based on the to-be-recommended item, the real-time match state information, and basic match information acquired from the state manager, and update a to-be-pushed message record in the state manager, if the current time point is the recommendation node; and push the to-be-pushed message.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for pushing information based on artificial intelligence, comprising:
    mining, in response to a new match occurring, real-time match data of the match and real-time associated data of the match;
    generating structured data using the real-time match data;
    generating a to-be-recommended item using the real-time associated data and an offline item;
    determining whether a current time point is a recommendation node based on the structured data and real-time match state information acquired from a state manager;
    generating, in response to determining that the current time point is the recommendation node, a to-be-pushed message based on the to-be-recommended item, the real-time match state information, and basic match information acquired from the state manager, and updating a to-be-pushed message record in the state manager, wherein generating the to-be-pushed message comprises:
        establishing an inverted index of the to-be-recommended item and a source document;
        generating a search formula based on the basic match information and the real-time match state information; and
        generating the to-be-pushed information based on the result of matching the search formula with the to-be-recommended item; and
    pushing the to-be-pushed message.

2. The method according to claim 1, wherein the real-time associated data of the match comprise one or more of:
    a real-time image of the match;
    a real-time video of the match;
    user generated content of the match;
    knowledge of the match; or
    news of the match.

3. The method according to claim 1, wherein the determining whether a current time point is a recommendation node based on the structured data and real-time match state information acquired from a state manager comprises:
    determining a current match state vector based on the structured data and a preset characteristic of the real-time match state information acquired from the state manager;
    searching for a match state vector corresponding to the current match state vector among a data pair of a pre-marked match state vector and a recommendation binary; and
    determining whether the current time point is the recommendation node, based on the recommendation binary corresponding to the match state vector corresponding to the current match state vector in the data pair.

4. The method according to claim 3, wherein the preset characteristic of the real-time match state information comprises one or more of:
- a basic characteristic of the real-time match state information;
- an event characteristic of the real-time match state information;
- a context characteristic of the real-time match state information; or
- a dynamic calculation characteristic of the real-time match state information.

5. The method according to claim 1, wherein generating the to-be-pushed message based on the to-be-recommended item, the real-time match state information, and the basic match information acquired from the state manager further comprises:
- generating an eigenvector based on a preset characteristic and a weight of the to-be-recommended item;
- determining whether the to-be-recommended item matching the search formula is found in the inverted index;
- acquiring, in response to the to-be-recommended item matching the search formula being found, a recommended source document, the recommended source document being the source document corresponding to the to-be-recommended item matching the search formula; and
- jumping to, in response to the to-be-recommended item matching the search formula being not found, the generating a search formula based on the basic match information and the real-time match state information;
- wherein establishing the inverted index of the to-be-recommended item and the source document is based on the eigenvector,
- wherein generating the to-be-pushed message is further based on the recommended source document.

6. The method according to claim 5, wherein the preset characteristic of the to-be-recommended item comprises one or more of:
- a playing team of the to-be-recommended item;
- a team member of the to-be-recommended item;
- an entity attribute of the to-be-recommended item; or
- resource generation time of the to-be-recommended item.

7. The method according to claim 5, wherein the generating the to-be-pushed message based on the recommended source document comprises:
- sorting the recommended source documents based on the preset characteristic of the recommended source document;
- calculating, for the sorted recommended source documents, one or more of: a diversity rating of a resource type, a timeliness rating of the resource type, or a popularity rating of the resource type;
- selecting a to-be-pushed source document from the sorted recommended source documents based on a calculated rating; and
- generating the to-be-pushed message based on the to-be-pushed source document.

8. The method according to claim 7, wherein the preset characteristic of the recommended source document comprises one or more of:
- a network source of the recommended source document;
- a search database source of the recommended source document;
- an overlapping degree between the recommended source document and a current match state vector entity;
- a mining duration of the recommended source document; or
- a popularity of the recommended source document.

9. The method according to claim 1, wherein the generating a to-be-pushed message comprises: generating the to-be-pushed message using a commentary model.

10. An apparatus for pushing information based on artificial intelligence, comprising:
- at least one processor; and
- a memory storing instructions, the instructions when executed by the at least one processor, cause the at least one processor to perform operations, the operations comprising:
  - mining, in response to a new match occurring, real-time match data of the match and real-time associated data of the match;
  - generating structured data using the real-time match data;
  - generating a to-be-recommended item using the real-time associated data and an offline item;
  - determining whether a current time point is a recommendation node based on the structured data and real-time match state information acquired from a state manager;
  - generating, in response to determining that the current time point is the recommendation node, a to-be-pushed message based on the to-be-recommended item, the real-time match state information, and basic match information acquired from the state manager, and updating a to-be-pushed message record in the state manager, wherein generating the to-be-pushed message comprises:
    - establishing an inverted index of the to-be-recommended item and a source document;
    - generating a search formula based on the basic match information and the real-time match state information; and
    - generating the to-be-pushed information based on the result of matching the search formula with the to-be-recommended item; and
  - pushing the to-be-pushed message.

11. The apparatus according to claim 10, wherein the real-time associated data of the match comprise one or more of:
- a real-time image of the match;
- a real-time video of the match;
- user generated content of the match;
- knowledge of the match; or
- news of the match.

12. The apparatus according to claim 10, wherein the determining whether a current time point is a recommendation node based on the structured data and real-time match state information acquired from a state manager comprises:
- determining a current match state vector based on the structured data and a preset characteristic of the real-time match state information acquired from the state manager;
- searching for a match state vector corresponding to the current match state vector among a data pair of a pre-marked match state vector and a recommendation binary; and
- determining whether the current time point is the recommendation node, based on the recommendation binary corresponding to the match state vector corresponding to the current match state vector in the data pair.

13. The apparatus according to claim 12, wherein the preset characteristic of the real-time match state information comprises one or more of:
- a basic characteristic of the real-time match state information;

an event characteristic of the real-time match state information;
a context characteristic of the real-time match state information; or
a dynamic calculation characteristic of the real-time match state information.

14. The apparatus according to claim 10, wherein generating the to-be-pushed message based on the to-be-recommended item, the real-time match state information, and the basic match information acquired from the state manager comprises:
generating an eigenvector based on a preset characteristic and a weight of the to-be-recommended item;
determining whether the to-be-recommended item matching the search formula is found in the inverted index;
acquiring, in response to the to-be-recommended item matching the search formula being found, a recommended source document, the recommended source document being the source document corresponding to the to-be-recommended item matching the search formula; and
jumping to, in response to the to-be-recommended item matching the search formula being not found, the generating a search formula based on the basic match information and the real-time match state information;
wherein establishing the inverted index of the to-be-recommended item and the source document is based on the eigenvector,
wherein generating the to-be-pushed message is further based on the recommended source document.

15. The apparatus according to claim 14, wherein the preset characteristic of the to-be-recommended item comprises one or more of:
a playing team of the to-be-recommended item;
a team member of the to-be-recommended item;
an entity attribute of the to-be-recommended item; or
resource generation time of the to-be-recommended item.

16. The apparatus according to claim 14, wherein the generating the to-be-pushed message based on the recommended source document comprises:
sorting the recommended source documents based on the preset characteristic of the recommended source document;
calculating, for the sorted recommended source documents, one or more of: a diversity rating of a resource type, a timeliness rating of the resource type, or a popularity rating of the resource type;
selecting a to-be-pushed source document from the sorted recommended source documents based on a calculated rating; and
generating the to-be-pushed message based on the to-be-pushed source document.

17. The apparatus according to claim 16, wherein the preset characteristic of the recommended source document comprises one or more of:
a network source of the recommended source document;
a search database source of the recommended source document;
an overlapping degree between the recommended source document and a current match state vector entity;
a mining duration of the recommended source document; or
a popularity of the recommended source document.

18. The apparatus according to claim 10, wherein the generating a to-be-pushed message comprises: generating the to-be-pushed message using a commentary model.

19. A non-transitory computer-readable storage medium storing a computer program, the computer program when executed by one or more processors, causes the one or more processors to perform operations, the operations comprising:
mining, in response to a new match occurring, real-time match data of the match and real-time associated data of the match;
generating structured data using the real-time match data;
generating a to-be-recommended item using the real-time associated data and an offline item;
determining whether a current time point is a recommendation node based on the structured data and real-time match state information acquired from a state manager;
generating, in response to determining that the current time point is the recommendation node, a to-be-pushed message based on the to-be-recommended item, the real-time match state information, and basic match information acquired from the state manager, and updating a to-be-pushed message record in the state manager, wherein generating the to-be-pushed message comprises:
establishing an inverted index of the to-be-recommended item and a source document;
generating a search formula based on the basic match information and the real-time match state information; and
generating the to-be-pushed information based on the result of matching the search formula with the to-be-recommended item; and
pushing the to-be-pushed message.

* * * * *